(12) United States Patent
Namuduri et al.

(10) Patent No.: US 12,034,324 B2
(45) Date of Patent: Jul. 9, 2024

(54) FLEXIBLE ELECTRIFIED VEHICLE POWER TRANSFER

(71) Applicant: GM Global Technology Operations LLC, Detroit, MI (US)

(72) Inventors: Chandra S. Namuduri, Troy, MI (US); Rashmi Prasad, Troy, MI (US); Minh-Khai Nguyen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 78 days.

(21) Appl. No.: 17/976,063

(22) Filed: Oct. 28, 2022

(65) Prior Publication Data
US 2024/0146075 A1 May 2, 2024

(51) Int. Cl.
| | |
|---|---|
| H02J 7/00 | (2006.01) |
| B60L 1/00 | (2006.01) |
| B60L 50/60 | (2019.01) |
| B60L 58/19 | (2019.01) |
| H01M 10/42 | (2006.01) |
| H01M 10/44 | (2006.01) |
| H01M 10/615 | (2014.01) |
| H01M 10/625 | (2014.01) |
| H01M 50/204 | (2021.01) |
| H01M 50/249 | (2021.01) |
| H01M 50/269 | (2021.01) |

(52) U.S. Cl.
CPC ............ *H02J 7/0024* (2013.01); *B60L 1/003* (2013.01); *B60L 50/60* (2019.02); *B60L 58/19* (2019.02); *H01M 10/425* (2013.01); *H01M 10/441* (2013.01); *H01M 10/615* (2015.04); *H01M 10/625* (2015.04); *H01M 50/204* (2021.01); *H01M 50/249* (2021.01); *H01M 50/269* (2021.01); *H01M 2220/20* (2013.01); *H02J 2207/20* (2020.01)

(58) Field of Classification Search
CPC .......... H02J 7/00; H01M 10/00; H01M 50/00; B60L 50/00; B60L 53/00; B60L 1/00
See application file for complete search history.

(56) References Cited

U.S. PATENT DOCUMENTS

| | | | |
|---|---|---|---|
| 9,102,238 B2* | 8/2015 | Ohtomo | B60L 3/04 |
| 10,562,403 B2* | 2/2020 | Falconer | B60L 50/64 |
| 11,569,745 B2 | 1/2023 | Prasad et al. | |
| 11,607,967 B2 | 3/2023 | Prasad et al. | |
| 2008/0094013 A1* | 4/2008 | Su | H02P 5/747 |
| | | | 180/54.1 |
| 2018/0229613 A1* | 8/2018 | Rajaie | B60L 53/16 |
| 2020/0106287 A1* | 4/2020 | Niimi | H02P 27/06 |
| 2020/0164755 A1* | 5/2020 | Smolenaers | B60L 53/53 |
| 2021/0001738 A1* | 1/2021 | Youn | H02J 7/007 |
| 2021/0242691 A1* | 8/2021 | Hao | B60L 53/16 |

(Continued)

*Primary Examiner* — Rexford N Barnie
*Assistant Examiner* — Joseph N Inge
(74) *Attorney, Agent, or Firm* — CANTOR COLBURN LLP

(57) ABSTRACT

An electrified vehicle may include a plurality of electric drive units, a plurality of battery packs, a plurality of charge ports and a plurality of controllable switches. The switches may be controlled to flexibly configure power transfer into and out of the vehicle through one or more charge ports affecting one or more battery packs in parallel or individually passively or actively through inverter integrated converter charge transfer.

20 Claims, 2 Drawing Sheets

(56) References Cited

U.S. PATENT DOCUMENTS

| | | | |
|---|---|---|---|
| 2022/0224271 A1* | 7/2022 | Cui | H03K 3/037 |
| 2022/0340026 A1* | 10/2022 | Prasad | H02P 27/06 |
| 2023/0122499 A1* | 4/2023 | Holeton | B60L 58/20 |
| | | | 320/109 |
| 2023/0299702 A1* | 9/2023 | Hao | H02M 7/5387 |
| 2023/0369879 A1* | 11/2023 | Prasad | H02M 3/335 |

\* cited by examiner

FLEXIBLE ELECTRIFIED VEHICLE POWER TRANSFER

INTRODUCTION

The subject disclosure relates to electric vehicle (EV) power transfer. More particularly, the subject disclosure relates to electric power transfer between an on-vehicle power source and an off-vehicle power source for an EV.

EVs may include battery electric vehicles (BEV) or hybrid electric vehicles (HEV), each of which may include an electric traction motor providing or contributing propulsion torque to the powertrain and powered by a rechargeable energy storage system (RESS) through a traction power inverter module (TPIM).

Medium and heavy duty electrified vehicles may employ high capacity (e.g., >150 kWh) 800 volt electrical energy storage systems. Existing charging station infrastructure includes lower voltage (e.g., 400 volts) and limited power delivery (e.g., <150 kW) capabilities.

SUMMARY

In one exemplary embodiment, an electrified vehicle may include a plurality of electric drive units (EDUs), each EDU having a corresponding power inverter coupled to a corresponding motor stator winding, to a corresponding positive DC rail and to a corresponding negative DC rail, all negative DC rails being commonly coupled. The electrified vehicle may also include a plurality of battery packs, each battery pack having a corresponding battery pack positive terminal and a corresponding battery pack negative terminal. The electrified vehicle may further include a plurality of charge ports, each charge port having a corresponding charge port positive terminal and a corresponding charge port negative terminal. The electrified vehicle may additionally include: respective first, second and third switches corresponding to each of the plurality of charge ports, each respective first switch coupled between the corresponding charge port positive terminal and the corresponding battery pack positive terminal of a respective one of the plurality of battery packs, each respective second switch coupled between the corresponding charge port negative terminal and the corresponding battery pack negative terminal of the respective one of the plurality of battery packs, and each respective third switch coupled between the corresponding charge port positive terminal and the corresponding motor stator winding of a respective one of the plurality of EDUs; and respective fourth and fifth switches corresponding to each of the plurality of battery packs, each respective fourth switch coupled between the corresponding battery pack positive terminal and the corresponding positive DC rail of the one of the plurality of EDUs that has its corresponding motor stator winding coupled to the respective third switch that is coupled between the corresponding motor stator winding and the corresponding charge port positive terminal that is coupled to the respective first switch that is coupled between the corresponding charge port positive terminal and the corresponding battery pack positive terminal, and each respective fifth switch coupled between the corresponding battery pack negative terminal and the corresponding negative DC rail of the one of the plurality of EDUs.

In addition to one or more of the features described herein, the electrified vehicle may further include an accessory bus coupled to non-propulsion vehicle loads having an accessory bus positive terminal and an accessory bus negative terminal, and respective sixth switches corresponding to each of the plurality of EDUs, each respective sixth switch coupled between the corresponding positive DC rail and the accessory bus positive terminal.

In addition to one or more of the features described herein, the electrified vehicle may further include respective seventh switches corresponding to each of the plurality of EDUs, each respective seventh switch coupled between the corresponding motor stator winding and the respective third switch that is coupled between the corresponding motor stator winding and the corresponding charge port positive terminal.

In addition to one or more of the features described herein, the electrified vehicle may further include respective pre-charge circuits coupled across each respective fourth switch.

In addition to one or more of the features described herein, each battery pack may have an equivalent nominal voltage.

In addition to one or more of the features described herein, non-propulsion vehicle loads may include an auxiliary power module.

In addition to one or more of the features described herein, non-propulsion vehicle loads may include an air conditioning electronic compressor.

In addition to one or more of the features described herein, non-propulsion vehicle loads may include a battery pack heater.

In addition to one or more of the features described herein, the electrified vehicle may further include a controller executing a parallel propulsion mode of operation of the electrified vehicle including opening each respective first, second and third switch to disconnect the plurality of charge ports from the corresponding battery packs and the corresponding motor stator windings, and closing each respective fourth, fifth and sixth switch to connect the plurality of battery packs and the plurality of EDUs in parallel.

In addition to one or more of the features described herein, the electrified vehicle may further include a controller executing a single port to parallel battery pack passive charge transfer mode of operation of the electrified vehicle including opening each respective third switch to disconnect the plurality of charge ports from the corresponding motor stator windings, closing the respective first and second switches corresponding to one of the plurality of charge ports and opening the respective first and second switches corresponding to every other of the plurality of charge ports, and closing each respective fourth, fifth and sixth switch to connect the plurality of battery packs in parallel.

In addition to one or more of the features described herein, the electrified vehicle may further include a controller executing a multiple port to parallel battery pack passive charge transfer mode of operation of the electrified vehicle including opening each respective third switch to disconnect the plurality of charge ports from the corresponding motor stator windings, closing the respective first and second switches corresponding to at least two of the plurality of charge ports and opening the respective first and second switches corresponding to every other of the plurality of charge ports, and closing each respective fourth, fifth and sixth switch to connect the plurality of battery packs in parallel.

In addition to one or more of the features described herein, the electrified vehicle may further include a controller executing a single port to individual battery pack passive charge transfer mode of operation of the electrified vehicle including opening each respective third switch to disconnect the plurality of charge ports from the corresponding motor stator windings, closing the respective first and second switches corresponding to at least one of the plurality of charge ports.

In addition to one or more of the features described herein, the electrified vehicle may further include a controller executing a single port to parallel battery pack active charge transfer mode of operation of the electrified vehicle including closing the respective second and third switches corresponding to one of the plurality of charge ports, opening the respective first switch corresponding to the one of the plurality of charge ports, opening the respective first, second and third switches corresponding to every other of the plurality of charge ports, and closing each respective fourth, fifth and sixth switch to connect the plurality of battery packs in parallel.

In addition to one or more of the features described herein, the electrified vehicle may further include a controller executing a single port to individual battery pack active charge transfer mode of operation of the electrified vehicle including closing the respective second and third switches corresponding to at least one of the plurality of charge ports, opening the respective first switch corresponding to the at least one of the plurality of charge ports, opening the respective first, second and third switches corresponding to every other of the plurality of charge ports, and closing each respective fourth and fifth switch corresponding to the respective battery pack that is coupled by the respective second switch corresponding to the at least one of the plurality of charge ports.

In addition to one or more of the features described herein, the electrified vehicle may further include a controller executing a mixed passive charge transfer and active charge transfer mode of operation of the electrified vehicle including, for a first one of the plurality of charge ports, closing the respective first and second switches, opening the respective third switch, and closing the respective fourth and fifth switches corresponding to the respective battery pack that is coupled by the respective second switch corresponding to the first one of the plurality of charge ports, and for a second one of the plurality of charge ports, closing the respective second and third switches, opening the respective first switch, and closing each respective fourth and fifth switch corresponding to the respective battery pack that is coupled by the respective second switch corresponding to the second one of the plurality of charge ports.

In addition to one or more of the features described herein, the electrified vehicle may further include a controller executing a pre-charge mode of operation of the electrified vehicle including opening each respective first, second, third and fourth switch, closing each respective fifth and sixth switch, and activating at least one of the respective pre-charge circuits.

In another exemplary embodiment, an electrified vehicle may include a plurality of electric drive units (EDUs), each EDU having a corresponding power inverter coupled to a corresponding motor stator winding, to a corresponding positive DC rail and to a corresponding negative DC rail, all negative DC rails being commonly coupled, a plurality of battery packs, each battery pack having a corresponding battery pack positive terminal and a corresponding battery pack negative terminal, a plurality of charge ports, each charge port having a corresponding charge port positive terminal and a corresponding charge port negative terminal, a plurality of controllable switches, and a controller configured to selectively control the plurality of controllable switches in a propulsion mode disconnecting the plurality of charge ports from the plurality of battery packs and the plurality of EDUs, and connecting the plurality of battery packs and the plurality of EDUs in parallel, in a parallel charge transfer mode connecting the plurality of battery packs in parallel and connecting at least one of the plurality of charge ports to the plurality of battery packs, and in an inverter integrated converter charge transfer mode disconnecting the respective charge port positive terminal of one of the plurality of charge ports from the plurality of battery packs, connecting the respective charge port positive terminal of the one of the plurality of charge ports to the motor stator winding of one of the plurality of EDUs, connecting the respective charge port negative terminal of the one of the plurality of charge ports to the respective battery pack negative terminal of one of the plurality of battery packs, connecting the respective positive DC rail of the one of the plurality of EDUs to the respective battery pack positive terminal of the one of the plurality of battery packs, and connecting the respective negative DC rail of the one of the plurality of EDUs to the respective battery pack negative terminal of the one of the plurality of battery packs.

In addition to one or more of the features described herein, each EDU may further include a respective pre-charge circuit.

In addition to one or more of the features described herein, each battery pack may include an equivalent nominal voltage.

In addition to one or more of the features described herein, the controller may further be configured to selectively control the plurality of controllable switches in a pre-charge mode disconnecting the plurality of charge ports from the plurality of battery packs and the plurality of EDUs, connecting each respective negative DC rail of the plurality of EDUs to the respective battery pack negative terminal of one of the plurality of battery packs, and activating at least one of the respective pre-charge circuits.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
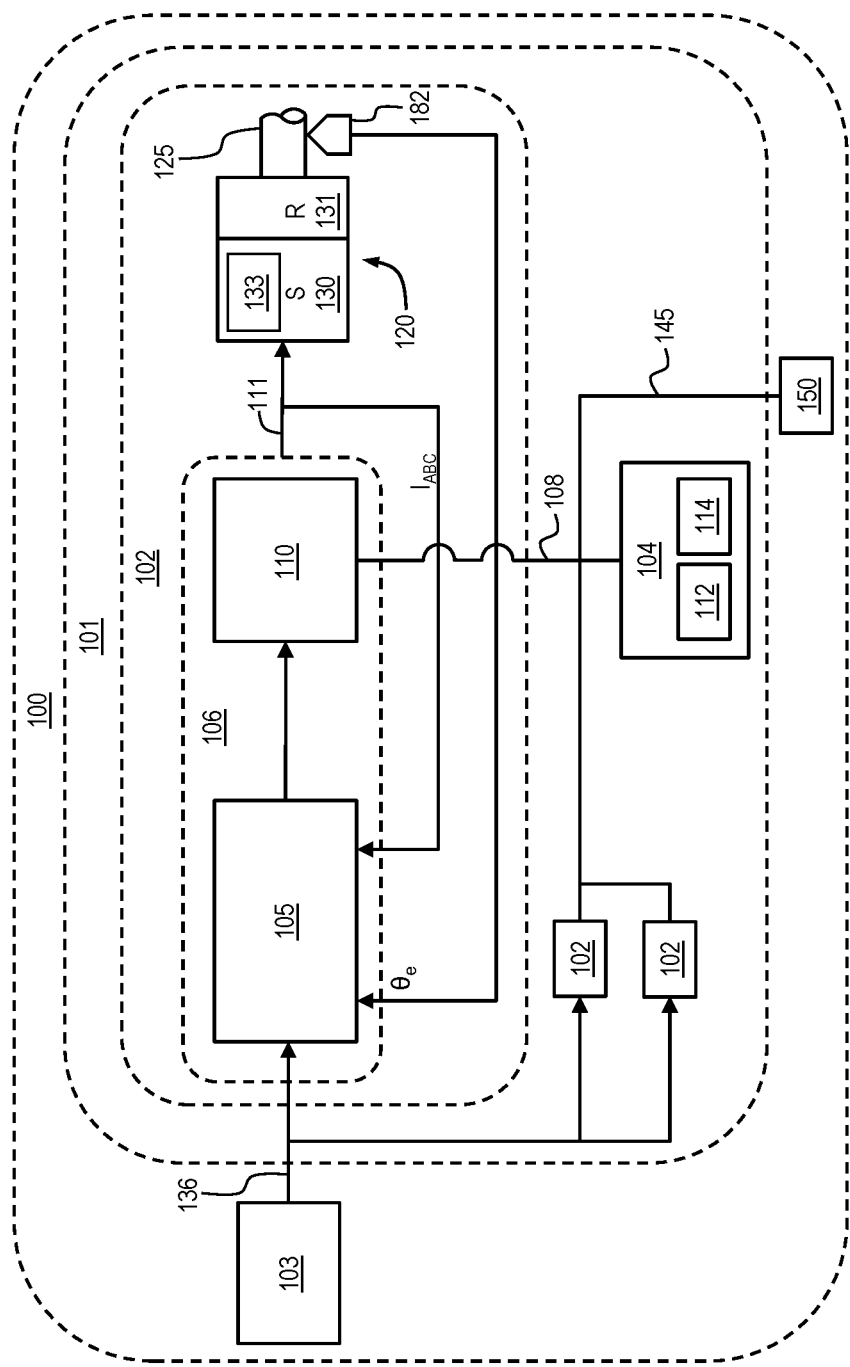
FIG. 1 illustrates an electric propulsion system in an electrified vehicle, in accordance with one or more embodiments.

The following description is merely exemplary in nature and is not intended to limit the present disclosure, its application or uses. Throughout the drawings, corresponding reference numerals indicate like or corresponding parts and features.

FIG. 1 schematically illustrates an embodiment of an exemplary electric propulsion system 101 on an electrified vehicle 100. Vehicle and vehicular are understood to refer to any means of transportation including non-limiting examples of motorcycles, cars, trucks, buses, excavation, earth moving, construction and farming equipment, railed vehicles like trains and trams, and watercraft like ships and boats. The electric propulsion system 101 may include various control components and electrical and electro-mechanical systems including, for example, a rechargeable energy storage system (RESS) 104 and multiple electric drive units (EDUs) 102. The electric propulsion system 101 may be employed in a powertrain system to generate propulsion torque as a replacement for, or in conjunction with, an internal combustion engine in various electric vehicle (EV) applications and hybrid electric vehicle (HEV) applications, respectively.

The EDUs 102 may be of varying complexity, componentry, integration and power capabilities. FIG. 1 illustrates the electric propulsion system 101 having three EDUs 102 wherein one EDU is illustrated in detail with the understanding that the other EDUs 102 are similarly configured. Each EDU 102 may include, for example, an alternating current (AC) motor (motor) 120 and a traction power inverter module (TPIM) 106 including a motor controller 105 and a power inverter 110. The motor 120 may include a stator 130 (S) including stator winding 133 and a rotor 131 (R) coupled to a motor output shaft 125 and a position sensor 182, for example a variable reluctance resolver or an encoder. The position sensor 182 may signally connect directly to the motor controller 105 and is employed to monitor angular position of the rotor ($\theta_e$) of the motor 120. The angular position of the rotor ($\theta_e$) of the motor 120 is employed by the motor controller 105 to control operation of the inverter module 110 that controls the motor 120.

The motor output shaft 125 may transfer torque between the motor 120 and driveline components (not illustrated), for example a final drive which may include reduction and differential gear sets and one or more axle outputs. The final drive may simply include reduction gearing and a prop shaft output coupling to a differential gear set. One or more axles may couple to the final drive or differential gear sets if separate therefrom. Axle(s) may couple to a vehicle wheel(s) for transferring tractive force between a wheel and pavement. One having ordinary skill in the art will recognize alternative arrangements for driveline components. Propulsion torque requests or commands 136 ($T_{cmd}$) may be provided by a vehicle controller 103 to the motor controller 105 of the TPIM 106 of EDU 102.

In an embodiment, the RESS 104 may include multiple electro-chemical battery packs 112, for example high capacity, high voltage (HV) rechargeable lithium ion battery packs for providing power to the vehicle via a HV direct current (DC) bus 108. An accessory bus 145 may couple to the HV DC bus 108 for providing electrical energy to high voltage accessory loads 150. The RESS 104 may also include a battery manager module 114. The RESS 104 battery packs 112 may be constructed from a plurality of battery pack modules allowing for flexibility in configurations and adaptation to application requirements. Battery packs may include a plurality of battery pack modules constructed from a plurality of cells allowing for flexibility in configurations and adaptation to application requirements. Battery pack modules may include a plurality of cells allowing for flexibility in configurations and adaptation to application requirements. For example, in vehicular uses, the battery packs 112 and battery pack modules may be modular to the extent that their numbers and configurations may be varied to accommodate a desired energy density or range objective of a particular vehicle platform, intended use, or cost target and in accordance with propulsion and charging functions and propulsion system architecture. Selective reconfiguration of the battery packs 112 and the battery pack modules may be by way of controllable switches (e.g., contactors) for opening and closing various electrical paths effective to provide various parallel and series configurations of the battery packs 112 and the battery pack modules. For example, the RESS 104 may include a plurality of battery packs 112 each having a nominal voltage of 800 volts and being configured in parallel in 800 volt propulsion architectures during propulsion and during direct current fast charging (DCFC). The battery packs 112 may also be selectively coupled to the HV DC bus 108 and to charge ports by way of controllable switches. Some or all such controllable switches may be integrated into one or more controllable battery disconnect units (BDU) (not illustrated) or distributed variously within components or subsystems such as the RESS 104. It is understood that the RESS 104 may be reconfigurable at any level of integration including battery pack, battery module and cell levels.

The motor 120 may be a poly-phase AC motor receiving poly-phase AC power over a poly-phase motor control power bus (AC bus) 111 which is coupled to the power inverter 110. In one embodiment, the motor 120 is a three-phase motor and the power inverter 110 is a three-phase inverter. The power inverter 110 may include a plurality of solid-state switches such as IGBTs and power MOSFETs. The power inverter 110 receives DC power over the HV DC bus 108 from the RESS 104, for example at 800 volts. The motor controller 105 is coupled to the power inverter 110 for control thereof. The power inverter 110 electrically connects to stator phase windings of a poly-phase stator winding of the motor 120 via the AC bus 111, with electric current monitored on two or three of the phase leads thereof. The power inverter 110 is configured with suitable control circuits including paired power transistors (e.g., IGBTs for transforming high-voltage DC electric power to high-voltage AC electric power and transforming high-voltage AC electric power to high-voltage DC electric power). The power inverter 110 may employ pulse width modulation (PWM) control to convert stored DC electric power originating in the battery pack 112 of the RESS 104 to AC electric power to drive the motor 120 to generate torque. Similarly, the inverter 110 may convert mechanical power transferred to the motor 120 to DC electric power to generate electric energy that is storable in the battery packs 112 of the RESS 104, including as part of a regenerative control strategy. The power inverter 110 may be configured to receive motor control commands from motor controller 105 and control inverter states to provide the motor drive and regeneration functionality.

Control of the power inverter 110 may include high frequency switching of the solid-state switches in accordance with a PWM control. A number of design and application considerations and limitations determine inverter switching frequency and PWM control. Inverter controls for AC motor applications may include fixed switching frequencies, for example switching frequencies around 10-12 kHz and PWM controls that minimize switching losses of the IGBTs or other power switches of the power inverter 110.

Figure 2:
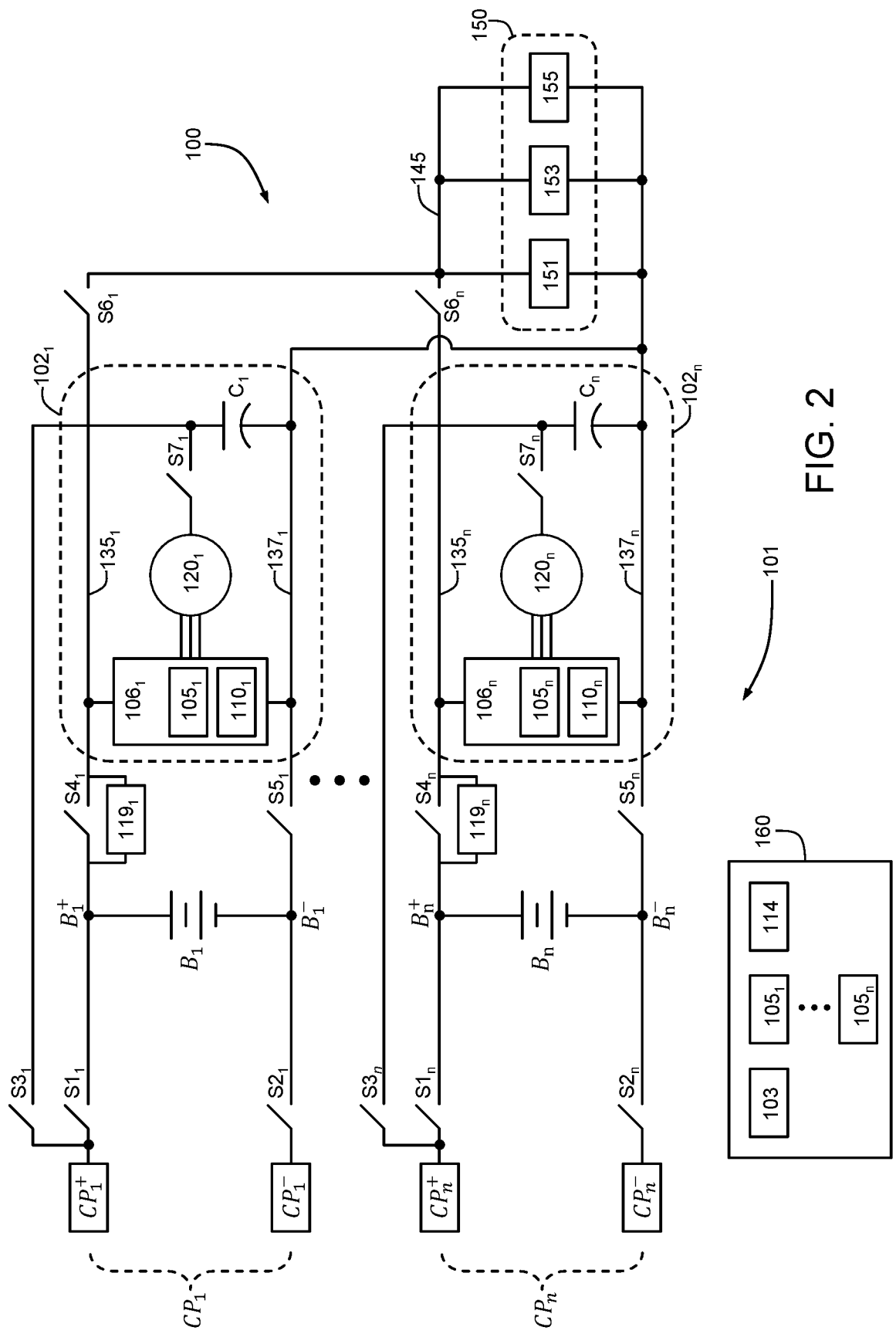
FIG. 2 illustrates an electrified vehicle including an electric propulsion system having multiple electric drive units, battery packs and charge ports configurable for electric power transfer between the vehicle and an off-vehicle power source, in accordance with one or more embodiments.

Referring to FIG. 2, an embodiment of the electrified vehicle 100 may include a plurality of charge ports, a plurality of battery packs and a plurality of EDUs as further described herein. The vehicle 100 may also include a plurality of controllable switches as further described herein. In an embodiment, the number of one or more of the plurality of EDUs, the plurality of battery packs, and the plurality of charge ports may be different from the others. In the illustrated embodiment of FIG. 2, the number of EDUs, the number of battery packs and the number of charge ports are equal and in the general case 'n' designates the plurality number. FIG. 2 illustrates the first and the last of the plurality 'n' of the EDUs, battery packs, charge ports and corresponding switches as further described herein.

In the exemplary electrified vehicle 100 embodiment of FIG. 2, the following description refers in detail to the first of 'n' EDUs, battery packs, charge ports and corresponding switches using the subscripted numeral '1', it being understood that each additional second through 'n' EDUs, battery packs, charge ports and corresponding switches may be identically configured though not separately illustrated with the exception of the 'nth' such configuration for demonstrative clarity of the structural identity and functional interaction. Thus, the electrified vehicle 100 embodiment of FIG. 2 may include an EDU $102_1$, a battery pack $B_1$, charge port $CP_1$ and switches $S1_1$, $S2_1$, $S3_1$, $S4_1$, $S5_1$, $S6_1$ and $S7_1$. Switches $S1_1$, $S2_1$, $S3_1$, $S4_1$, $S5_1$, $S6_1$ and $S7_1$ may be electromechanical relays or solid state devices. The EDU $102_1$ may include a TPIM $106_1$ (including a power inverter $110_1$ and motor controller $105_1$), a motor $120_1$ including a stator winding, and a positive DC rail $135_1$ and negative DC rail $137_1$. The power inverter $110_1$ of TPIM $106_1$ is coupled to the motor stator winding of the motor $120_1$ and to the positive DC rail $135_1$ and negative DC rail $137_1$. The TPIM $106_1$ may include an inverter input bulk/filter capacitor (not shown) coupled between the positive DC rail $135_1$ and negative DC rail $137_1$. A capacitor pre-charge circuit $119_1$ ($PC_1$) may enable selective charging of the inverter input bulk/filter capacitor by coupling to the battery pack $B_1$ prior to switch $S4_1$ closure. For example, the capacitor pre-charge circuit $119_1$ ($PC_1$) may be employed to pre-charge the inverter input bulk/filter capacitor prior to effecting electric power transfer between the battery packs $B_1 \ldots B_n$ and one or more off-vehicle power source. The pre-charge circuit $119_1$ ($PC_1$) in one embodiment may include a current limiting resistor in series with a controllable switch. In an embodiment, the negative DC rails $137_1 \ldots 137n$ are commonly coupled. The battery pack $B_1$ includes a battery pack positive terminal $B_1^+$ and a battery pack negative terminal $B_1^-$. The charge port $CP_1$ includes a charge port positive terminal $CP_1^+$ and a charge port negative terminal $CP_1^-$.

Charge port switches $S1_1$, $S2_1$ and $S3_1$ correspond to the charge port $CP_1$. Switch $S1_1$ is coupled between the charge port positive terminal $CP_1^+$ and the battery pack positive terminal $B_1^+$ for controllably connecting and disconnecting the charge port positive terminal $CP_1^+$ and the battery pack positive terminal $B_1^+$. Switch $S2_1$ is coupled between the charge port negative terminal $CP_1^-$ and the battery pack negative terminal $B_1^-$ for controllably connecting and disconnecting the charge port negative terminal $CP_1^-$ and the battery pack negative terminal $B_1^-$. Closure of both switch $S1_1$ and switch $S2_1$ serves to couple the respective battery pack $B_1$ to the respective charge port $CP_1$ for passive power transfer. Thus, the switches (e.g., $S1_1$ and $S2_1$) corresponding to a charge port $CP_1$ may together be referred to as passive charge port switches. Switch $S3_1$ is coupled between the charge port positive terminal $CP_1^+$ and the stator winding of the motor $120_1$ for controllably connecting and disconnecting the charge port positive terminal $CP_1$ and the stator winding of the motor $120_1$. The terminal to which switch $S3_1$ is connected may be the neutral terminal or one of the phase windings of the motor stator winding. In an embodiment, switch $S3_1$ may be coupled to the stator winding $120_1$ through an additional series connected switch $S7_1$. Closure of both switch $S2_1$ and switch $S3_1$ (and switch $S7_1$ where configured) serves to enable electric power transfers between an off-vehicle power source and battery packs (or other loads) coupled between the positive DC rail $135_1$ and negative DC rail $137_1$ vis-à-vis inverter integrated converter operation of the power inverter $110_1$ and stator winding of the motor $120_1$. Inverter integrated converter operation may also be referred to herein as active power transfer. Thus, the switches (e.g., $S2_1$ and $S3_1$) corresponding to a charge port $CP_1$ (and switch $S7_1$ where configured) may together be referred to as active charge port switches. In an embodiment where switch $S7_1$ may be coupled between the stator winding of the motor $120_1$ and the switch $S3_1$. A filter capacitor $C_1$ may be coupled between the node between the switch $S3_1$ and the switch $S7_1$ and the negative DC rail $137_1$. During inverter integrated converter charge transfer modes, the filter capacitor $C_1$ may reduce the ripple current drawn from or reflected back to the charge port $CP_1$ to minimize conducted electrical noise associated with the ripple current through the charge port $CP_1$. Switch $S7_1$ may function to disconnect the filter capacitor $C_1$ from the corresponding motor stator winding when it is not used for inverter integrated converter charge transfer modes (e.g., propulsion, passive charge transfers). In an alternate embodiment, an off-vehicle power source may include the filter capacitor coupled across the DC power source. In such configurations, switch $S7_1$ may not be required since disconnection of the filter capacitor occurs through switch $S3_1$ which may only be closed during inverter integrated converter charge transfer modes.

Battery pack switches $S4_1$ and $S5_1$ correspond to the battery pack $B_1$. Switch $S4_1$ is coupled between the battery pack positive terminal $B_1^+$ and the positive DC rail $135_1$. Switch $S5_1$ is coupled between the battery pack negative terminal $B_1^-$ and the negative DC rail $137_1$. Closure of both switch $S4_1$ and switch $S5_1$ serves to place the respective battery pack $B_1$ across the positive DC rail $135_1$ and the negative DC rail $137_1$ also thereby coupling the battery pack $B_1$ to the power inverter $110_1$ of the TPIM $106_1$.

Parallel switch $S6_1$ corresponds to the EDU $102_1$. Switch $S6_1$ may be coupled between the positive DC rail $135_1$ and the positive side of the accessory bus 145 for controllably connecting and disconnecting the positive DC rail $135_1$ and the positive side of the accessory bus 145 for providing power to accessory loads 150 such as an auxiliary power module 151 (e.g., to step down higher voltages to lower voltages), an air conditioning electronic compressor 153 and a battery pack heater 155. In an embodiment, the negative side of the accessory bus 145 is commonly coupled to the negative DC rails $137_1 \ldots 137_n$. Switch $S6_1$ may in conjunction with other switches $S6_n$ controllably connect and disconnect the positive DC rail $135_1$ and the positive DC rail $135_n$. Closure of multiple switches $S6_1 \ldots S6_n$ serves to place the respective EDUs $102_1 \ldots 102_n$ in parallel.

The electric propulsion system 101 of the electrified vehicle 100 may include a control system 160 including one or more electronic control units (ECU), for example the vehicle controller 103, the battery manager module 114, and the multiple motor controllers $105_1 \ldots 105_n$ of the multiple TPIMs $106_1 \ldots 106_n$. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/ output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module may have a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

The control system may be responsible for carrying out functions related to the propulsion system 101 monitoring, control and diagnostics based upon a plurality of inputs. The vehicle controller 103 may include one or more ECUs and may be responsible as a supervisor for interpreting various user and environmental inputs, information and control arbitration, and issuing and receiving control commands and requests to and from various other ECUs, including the battery manager module 114 and the multiple motor controllers $105_1 \ldots 105_n$. The vehicle controller 103 may be capable, directly or through another ECU, of performing vehicle-to-vehicle (V2V) and vehicle-to-infrastructure (V2I) communications related to electric power transfers from and to off-vehicle power sources. Such communication may be wireless or via wired connections, for example through charge port data transfers. The battery manager module 114 may receive a plurality of inputs related to the RESS 104 including, for example, battery pack 112 voltages, currents and temperatures at cell, module and pack levels at various module configurations. The motor controller $105_1 \ldots 105_n$ may receive various inputs used in the monitoring, control and diagnosis of the motor $120_1 \ldots 120n$ and the power inverter $110_1 \ldots 110_n$, including motor phase currents and rotor position information. The motor controller $105_1 \ldots 105_n$ may control the motor $120_1 \ldots 120_n$ by issuing conduction commands to the power inverter $110_1 \ldots 110_n$ solid-state switches. The conduction commands may be issued in the form of PWM signals from the motor controller $105_1 \ldots 105_n$. Any suitable solid-state device may be employed as the power inverter 110 solid-state switches including, for example, solid-state devices such as Si IGBTs, Si MOSFETs, SiC MOSFETs, GaN HEMTs, SiC JFETs, Diamond, Gallium Oxide and other Wide Band Gap (WBG) semiconductor-based power switch devices. Each power inverter $110_1 \ldots 110_n$ solid-state switch may also have an associated anti-parallel diode either as a discrete component or integrated with each switch. In accordance with one embodiment, the battery manager module 114 may be responsible for monitoring and diagnosis of the battery packs $B_1 \ldots B_n$, for discharge and charge control including during propulsion operation and electric power transfers from and to off-vehicle power sources.

An off-vehicle power source (not shown) may include a DC charge station such as a DCFC station, which may transfer electric power to the electrified vehicle 100. In an embodiment, the DC charge station may be substantially matched to the battery pack voltage requirements (e.g., 800 volts charge station, 800 volts battery pack) wherein power transfer may be passive (i.e., not inverter integrated converter charge transfer). In an embodiment, the DC charge station may be substantially mismatched (e.g., 400 volts charge station or 1200 volts charge station, 800 volts battery pack) wherein power transfer may be active (i.e., inverter integrated converter charge transfer). The off-vehicle power source may also include another electric vehicle with its own RESS which may transfer electric power to, or receive electric power from, the electrified vehicle 100. Thus, another electric vehicle may be a donor vehicle or a recipient vehicle with respect to electrical power transfer. In such embodiments, the donor and recipient vehicles' respective RESS may be substantially matched and power transfer may be passive (i.e., not inverter integrated converter charge transfer). However, the donor and recipient vehicles' respective RESS may be substantially mismatched and power transfer may be active (i.e., inverter integrated converter charge transfer). The off-vehicle power source may have an electrical DC power source which in the case of a DC charge station may be provided through DC charge station rectified AC from a power grid or other AC power source such as wind turbines or an ICE generator set. In the case of another electric vehicle providing or receiving electric power, the electrical DC power source may be a respective RESS. The off-vehicle power source may be connected to the electrified vehicle 100 through one or more charge ports $CP_1$, $CP_n$ capable of DC-DC power transfer, for example through CCS, CHAdeMO, or other DC-DC capable connector protocol or standard, including wired communications between the host vehicle 100 and the off-vehicle power source.

In accordance with the present disclosure, an electrified vehicle as set forth herein may flexibly transfer electrical power via one or more charge ports. In an embodiment, an electrified vehicle may have a plurality of substantially identical parallel sections wherein the RESS may be controllably connected to multiple charge ports during power transfers or across multiple EDUs during propulsion. Multiple sections may be charged in parallel or individually by selectively configuring the sections and charge ports. All or fewer than all charge ports may be simultaneously utilized. Off vehicle power sources having mismatched nominal voltages relative to the electrified vehicle's battery packs may be used to charge the electrified vehicle battery packs through inverter integrated converter charge transfer configurations. Power may be bi-directionally transferred via the charge ports to or from the electrified vehicle, for example from a donor vehicle or to a recipient vehicle where the electrified vehicle battery packs and the donor or recipient vehicle do not nominally match. For example, vehicle to vehicle power transfers may include power transfer to a recipient vehicle at a lower nominal voltage through a buck operation of inverter integrated converter charge transfer. Similarly, vehicle to vehicle power transfers may include power transfer from a donor vehicle at a lower nominal voltage through a boost operation of inverter integrated converter charge transfer. Exemplary inverter integrated converter charge transfer is set forth in additional detail in commonly assigned U.S. patent application Ser. No. 17/743,737, filed May 13, 2022, entitled "VEHICLE INTEGRATED DC-DC ENERGY TRANSFER", the contents of which are incorporated by reference.

Table 1 herein illustrates exemplary, non-limiting modes of operation including switch states corresponding to the switch states of an embodiment of the electrified vehicle 100 including a plurality of charge ports, a plurality of battery packs and a plurality of EDUs as further described herein with respect to FIG. 2. Switch states may be controlled by the controller 160 as further described herein.

TABLE 1

|  | $S1_1$ | $S2_1$ | $S3_1$ | $S4_1$ | $S5_1$ | $S6_1$ | $S7_1$ | $PC_1$ | $S1_1$ | $S2_1$ | $S3_1$ | $S4_1$ | $S5_1$ | $S6_1$ | $S7_1$ | $PC_n$ |
|---|---|---|---|---|---|---|---|---|---|---|---|---|---|---|---|---|
| KEY OFF | 0 | 0 | 0 | 0 | 0 | 0 | 0 | 0 | 0 | 0 | 0 | 0 | 0 | 0 | 0 | 0 |
| PRE-CHARGE 1 | 0 | 0 | 0 | 0 | 1 | 1 | 0 | 1 | 0 | 0 | 0 | 0 | 1 | 1 | 0 | 0 |
| PROPULSION | 0 | 0 | 0 | 1 | 1 | 1 | 0 | 0 | 0 | 0 | 0 | 1 | 1 | 1 | 0 | 0 |
| DCFC PARALLEL 1 | 1 | 1 | 0 | 1 | 1 | 1 | 0 | 0 | 0 | 0 | 0 | 1 | 1 | 1 | 0 | 0 |
| DCFC INDIVIDUAL | 1 | 1 | 0 | 1 | 1 | 1 | 0 | 0 | 1 | 1 | 0 | 0 | 0 | 0 | 0 | 0 |
| DCFC PARALLEL n | 0 | 0 | 0 | 1 | 1 | 1 | 0 | 0 | 1 | 1 | 0 | 1 | 1 | 1 | 0 | 0 |
| FAULT PACK B1 | 0 | 0 | 0 | 0 | 0 | 0 | 0 | 0 | 1 | 1 | 0 | 1 | 1 | 1 | 0 | 0 |
| DCFC BOOST1 ... n | 0 | 1 | 1 | 1 | 1 | 1 | 1 | 0 | 0 | 1 | 1 | 1 | 1 | 0 | 1 | 0 |
| V2V BUCK1 ... n | 0 | 1 | 1 | 1 | 1 | 1 | 1 | 0 | 0 | 1 | 1 | 1 | 1 | 0 | 1 | 0 |
| SIMUL. DCFC 1 / V2V n | 1 | 1 | 0 | 1 | 1 | 1 | 0 | 0 | 0 | 1 | 1 | 1 | 1 | 1 | 1 | 0 |

In an embodiment, the controller 160 may execute a key off mode of operation of the electrified vehicle by opening all charge port switches $S1_1 \ldots S1_n$, $S2_1 \ldots S2_n$, and $S3_1 \ldots S3_n$, opening all battery pack switches $S4_1 \ldots S4_n$, $S5_1 \ldots S5_n$, opening all parallel switches $S6_1 \ldots S6_n$, opening all switches $S7_1 \ldots S7_n$ (as equipped), and deactivating of all pre-charge circuits $PC_1 \ldots PC_n$.

In an embodiment, the controller 160 may execute a fault mode of operation of the electrified vehicle to isolate a section by opening all associated charge port switches (e.g., $S1_1$, $S2_1$, and $S3_1$), opening all associated battery pack switches (e.g., S4, S5), opening the associated parallel switch (e.g., S6), opening the associated switch (e.g., $S7_1$) (as equipped), and deactivating the associated pre-charge circuits (e.g., $PC_1$).

In an embodiment, the controller 160 may execute a pre-charge mode of operation of the electrified vehicle to charge the inverter input bulk/filter capacitors, for example in preparation for propulsion. The pre-charge mode of operation may include closing switches by opening all charge port switches $S1_1 \ldots S1_n$, $S2_1 \ldots S2_n$, and $S3_1 \ldots S3_n$, closing all battery pack switches $S5_1 \ldots S5_n$, opening all battery pack switches $S4_1 \ldots S4_n$, closing all parallel switches $S6_1 \ldots S6_n$, and opening all switches $S7_1 \ldots S7_n$ (as equipped). The pre-charge mode of operation may further include activation of at least one of the pre-charge circuits $PC_1 \ldots PC_n$.

In an embodiment, the controller 160 may execute a parallel propulsion mode of operation of the electrified vehicle by opening all charge port switches $S1_1 \ldots S1_n$, $S2_1 \ldots S2_n$, and $S3_1 \ldots S3_n$ corresponding to all charge ports $CP_1 \ldots CP_n$ to disconnect all charge ports from the battery packs and the motor stator windings, by closing all battery pack switches $S4_1 \ldots S4_n$, $S5_1 \ldots S5_n$, and parallel switches $S6_1 \ldots S6_n$ to connect all battery packs $B_1 \ldots B_n$ and EDUs $102_1 \ldots 102_n$ in parallel, opening all switches $S7_1 \ldots S7_n$ (as equipped), and deactivating of all pre-charge circuits $PC_1 \ldots PC_n$. Advantageously, the parallel propulsion mode of operation enables multiple parallel battery packs to service the EDUs and high voltage accessory loads.

In an embodiment, the controller 160 may execute a single port to parallel battery pack passive power transfer mode of operation of the electrified vehicle by opening all charge port switches $S3_1 \ldots S3_n$ corresponding to all charge ports $CP_1 \ldots CP_n$, to disconnect all charge ports from the motor stator windings, closing one pair of passive charge port switches $S1_1/S2_1 \ldots S1_n/S2_n$, corresponding to one charge port $CP_1 \ldots CP_n$, to connect one charge port $CP_1 \ldots CP_n$, to a corresponding battery pack $B_1 \ldots B_n$, opening all other pairs of passive charge port switches corresponding to every other charge port to disconnect every other charge port from the battery packs, closing all battery pack switches $S4_1 \ldots S4_n$ and $S5_1 \ldots S5_n$, and parallel switches $S6_1 \ldots S6_n$ to connect all battery packs $B_1 \ldots B_n$ and EDUs $102_1 \ldots 102_n$ in parallel, opening all switches $S7_1 \ldots S7_n$ (as equipped), and deactivating of all pre-charge circuits $PC_1 \ldots PC_n$. Advantageously, the single port to parallel battery pack passive power transfer mode of operation enables passive power transfer (i.e., not inverter integrated converter charge transfer) between a single charge port and multiple parallel battery packs while also servicing the high voltage accessory loads.

In an embodiment, the controller 160 may execute a multiple port to parallel battery pack passive charge transfer mode of operation of the electrified vehicle by opening all charge port switches $S3_1 \ldots S3_n$ corresponding to all charge ports $CP_1 \ldots CP_n$, to disconnect all charge ports from the motor stator windings, closing at least two pairs of passive charge port switches $S1_1/S2_1 \ldots S1_n/S2_n$, corresponding to at least two charge ports $CP_1 \ldots CP_n$ to connect those charge ports $CP_1$ and $CP_n$ to corresponding battery packs $B_1 \ldots B_n$, and opening all other pairs of passive charge port switches corresponding to the remaining charge ports to disconnect the remaining charge ports from the battery packs, closing all battery pack switches $S4_1 \ldots S4_n$ and $S5_1 \ldots S5_n$, and parallel switches $S6_1 \ldots S6_n$ to connect all battery packs B $B_n$ and EDUs $102_1 \ldots 102_n$ in parallel, opening all switches $S7_1 \ldots S7_n$ (as equipped), and deactivating of all pre-charge circuits $PC_1 \ldots PC_n$. Advantageously, the multiple port to parallel battery pack passive power transfer mode of operation enables passive power transfer between multiple charge ports and multiple parallel battery packs while also servicing the high voltage accessory loads 150.

In an embodiment, the controller 160 may execute a single port to individual battery pack passive charge transfer mode of operation of the electrified vehicle by opening all charge port switches $S3_1 \ldots S3_n$ corresponding to all charge ports $CP_1 \ldots CP_n$ to disconnect all charge ports from the motor stator windings, closing at least one pair of passive charge port switches $S1_1/S2_1 \ldots S1_n/S2_n$, corresponding to charge ports $CP_1 \ldots CP_n$ to connect at least one of charge port $CP_1 \ldots CP_n$ to corresponding battery packs $B_1 \ldots B_n$, opening all switches $S7_1 \ldots S7_n$ (as equipped), and deactivating of all pre-charge circuits $PC_1 \ldots PC_n$. Advantageously, the single port to individual battery pack passive charge transfer mode of operation enables passive power transfer between a single charge port and a single corresponding battery pack. In an embodiment, one pair of battery pack switches $S4_1/S5_1 \ldots S4_n/S5_n$ of a charge port connected battery pack and the corresponding parallel switch $S6_1 \ldots S6_n$ may also be closed to connect the corresponding battery pack to the accessory bus 145 for servicing the high voltage accessory loads 150. Advantageously, the single port to individual battery pack passive charge transfer mode of operation enables passive power transfer between a single charge port and a single corresponding battery pack while also servicing the high voltage accessory loads 150.

In an embodiment, the controller 160 may execute a single port to parallel battery pack active charge transfer mode of operation of the electrified vehicle by closing the pair of active charge port switches $S3_1/S2_1 \ldots S3_n/S2_n$ (and corresponding switches $S7_1 \ldots S7_n$ (as equipped)), and opening the associated charge port switch $S1_1 \ldots S1_n$ corresponding to one of the charge ports $CP_1 \ldots CP_n$ to connect the one of charge port $CP_1 \ldots CP_n$ to a corresponding motor stator windings and disconnecting that charge port from the battery packs, opening the remaining charge port switches corresponding to every other of the charge port $CP_1 \ldots CP_n$ to disconnect those charge ports from the battery packs and motor stator windings, closing all battery pack switches $S4_1 \ldots S4_n$ and $S5_1 \ldots S5_n$, and parallel switches $S6_1 \ldots S6_n$ to connect all battery packs $B_1 \ldots B_n$ in parallel, and deactivating of all pre-charge circuits $PC_1 \ldots PC_n$. Advantageously, single port to parallel battery pack active charge transfer mode of operation enables active power transfer between a single charge port and multiple parallel battery packs while also servicing the high voltage accessory loads 150.

In an embodiment, the controller 160 may execute a single port to individual battery pack active charge transfer mode of operation of the electrified vehicle by closing the pair of active charge port switches $S3_1/S2_1 \ldots S3_n/S2_n$ (and corresponding switches $S7_1 \ldots S7_n$ (as equipped)), and opening the associated charge port switch $S1_1 \ldots S1_n$ corresponding to one of the charge ports $CP_1 \ldots CP_n$ to connect the one of charge port $CP_1 \ldots CP_n$ to a corresponding motor stator windings and disconnecting that charge port from the battery packs, opening the remaining charge port switches corresponding to every other of the charge ports $CP_1 \ldots CP_n$ to disconnect those charge ports from the battery packs and motor stator windings, closing the pair of battery pack switches $S4_1/S5_1 \ldots S4_n/S5_n$ associated with the EDU $102_1 \ldots 102_n$ whose motor stator windings are connected to the one of the charge ports $CP_1 \ldots CP_n$, and deactivating of all pre-charge circuits $PC_1 \ldots PC_n$. Advantageously, the single port to individual battery pack active charge transfer mode of operation enables active power transfer between a single charge port and a single corresponding battery pack. In an embodiment, a corresponding parallel switch $S6_1 \ldots S6_n$ may also be closed to connect the corresponding battery pack to the accessory bus 145 for servicing the high voltage accessory loads 150. Advantageously, the single port to individual battery pack passive charge transfer mode of operation enables passive power transfer between a single charge port and a single corresponding battery pack while also servicing the high voltage accessory loads 150.

In an embodiment, the controller 160 may execute a simultaneous passive charge transfer and active charge transfer mode of operation of the electrified vehicle by, for a first one of the charge ports $CP_1 \ldots CP_n$, closing the corresponding pair of passive charge port switches $S1_1/S2_1 \ldots S1_n/S2_n$ to connect that charge port $CP_1 \ldots CP_n$ to a corresponding battery pack $B_1 \ldots B_n$, opening the charge port switch $S3_1 \ldots S3_n$ corresponding to the first one of the charge ports $CP_1 \ldots CP_n$, and closing the pair of battery pack switches $S4_1/S5_1 \ldots S4_n/S5_n$ associated with the charge port connected battery pack, and for a second one of the plurality of charge ports, closing the corresponding pair of active charge port switches $S3_1/S2_1 \ldots S3_n/S2_n$ (and corresponding switches $S7_1 \ldots S7_n$ (as equipped)), and opening the corresponding charge port switch $S1_1 \ldots S1_n$ to connect the second one of the charge ports $CP_1 \ldots CP_n$, to a corresponding motor stator windings and disconnecting that charge port from the battery packs, and closing the pair of battery pack switches $S4_1/S5_1 \ldots S4_n/S5_n$ associated with the EDU $102_1 \ldots 102_n$ whose motor stator windings are connected to the second one of the charge ports $CP_1 \ldots CP_n$. Simultaneous passive charge transfer and active charge transfer mode of operation of the electrified vehicle may also include deactivating of all pre-charge circuits $PC_1 \ldots PC_n$.

The terminology used herein is for the purpose of describing particular embodiments only and is not intended to be limiting. The terms "a" and "an" do not denote a limitation of quantity, but rather denote the presence of at least one of the referenced items. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

All numeric values herein are assumed to be modified by the term "about" whether or not explicitly indicated. For the purposes of the present disclosure, ranges may be expressed as from "about" one particular value to "about" another particular value. The term "about" generally refers to a range of numeric values that one of skill in the art would consider equivalent to the recited numeric value, having the same function or result, or reasonably within manufacturing tolerances of the recited numeric value generally. Similarly, numeric values set forth herein are by way of non-limiting example and may be nominal values, it being understood that actual values may vary from nominal values in accordance with environment, design and manufacturing tolerance, age and other factors.

When an element such as a layer, film, region, or substrate is referred to as being "on" another element, it can be directly on the other element or intervening elements may also be present. In contrast, when an element is referred to as being "directly on" another element, there are no intervening elements present. Therefore, unless explicitly described as being "direct," when a relationship between first and second elements is described in the above disclosure, that relationship may be a direct relationship where no other intervening elements are present between the first and second elements but may also be an indirect relationship where one or more intervening elements are present (either spatially or functionally) between the first and second elements.

One or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Unless defined otherwise, technical and scientific terms used herein have the same meaning as is commonly understood by one of skill in the art to which this disclosure belongs.

Unless specified to the contrary herein, all test standards are the most recent standard in effect as of the filing date of this application, or, if priority is claimed, the filing date of the earliest priority application in which the test standard appears.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. An electrified vehicle, comprising:
a plurality of electric drive units (EDUs), each EDU comprising a corresponding power inverter coupled to a corresponding motor stator winding, to a corresponding positive DC rail and to a corresponding negative DC rail, all negative DC rails being commonly coupled;
a plurality of battery packs, each battery pack comprising a corresponding battery pack positive terminal and a corresponding battery pack negative terminal;
a plurality of charge ports, each charge port comprising a corresponding charge port positive terminal and a corresponding charge port negative terminal;
respective first, second and third switches corresponding to each of the plurality of charge ports, each respective first switch coupled between the corresponding charge port positive terminal and the corresponding battery pack positive terminal of a respective one of the plurality of battery packs, each respective second switch coupled between the corresponding charge port negative terminal and the corresponding battery pack negative terminal of the respective one of the plurality of battery packs, and each respective third switch coupled between the corresponding charge port positive terminal and the corresponding motor stator winding of a respective one of the plurality of EDUs; and
respective fourth and fifth switches corresponding to each of the plurality of battery packs, each respective fourth switch coupled between the corresponding battery pack positive terminal and the corresponding positive DC rail of the one of the plurality of EDUs that has its corresponding motor stator winding coupled to the respective third switch that is coupled between the corresponding motor stator winding and the corresponding charge port positive terminal that is coupled to the respective first switch that is coupled between the corresponding charge port positive terminal and the corresponding battery pack positive terminal, and each respective fifth switch coupled between the corresponding battery pack negative terminal and the corresponding negative DC rail of the one of the plurality of EDUs.

2. The electrified vehicle of claim 1, further comprising:
an accessory bus coupled to non-propulsion vehicle loads comprising an accessory bus positive terminal and an accessory bus negative terminal; and
respective sixth switches corresponding to each of the plurality of EDUs, each respective sixth switch coupled between the corresponding positive DC rail and the accessory bus positive terminal.

3. The electrified vehicle of claim 2, further comprising respective seventh switches corresponding to each of the plurality of EDUs, each respective seventh switch coupled between the corresponding motor stator winding and the respective third switch that is coupled between the corresponding motor stator winding and the corresponding charge port positive terminal.

4. The electrified vehicle of claim 2, further comprising:
respective pre-charge circuits coupled across each respective fourth switch.

5. The electrified vehicle of claim 1, wherein each battery pack comprises an equivalent nominal voltage.

6. The electrified vehicle of claim 2, wherein non-propulsion vehicle loads comprise an auxiliary power module.

7. The electrified vehicle of claim 2, wherein non-propulsion vehicle loads comprise an air conditioning electronic compressor.

8. The electrified vehicle of claim 2, wherein non-propulsion vehicle loads comprise a battery pack heater.

9. The electrified vehicle of claim 2, further comprising a controller executing a parallel propulsion mode of operation of the electrified vehicle comprising opening each respective first, second and third switch to disconnect the plurality of charge ports from the corresponding battery packs and the corresponding motor stator windings, and closing each respective fourth, fifth and sixth switch to connect the plurality of battery packs and the plurality of EDUs in parallel.

10. The electrified vehicle of claim 2, further comprising a controller executing a single port to parallel battery pack passive charge transfer mode of operation of the electrified vehicle comprising opening each respective third switch to disconnect the plurality of charge ports from the corresponding motor stator windings, closing the respective first and second switches corresponding to one of the plurality of charge ports and opening the respective first and second switches corresponding to every other of the plurality of charge ports, and closing each respective fourth, fifth and sixth switch to connect the plurality of battery packs in parallel.

11. The electrified vehicle of claim 2, further comprising a controller executing a multiple port to parallel battery pack passive charge transfer mode of operation of the electrified vehicle comprising opening each respective third switch to disconnect the plurality of charge ports from the corresponding motor stator windings, closing the respective first and second switches corresponding to at least two of the plurality of charge ports and opening the respective first and second switches corresponding to every other of the plurality of charge ports, and closing each respective fourth, fifth and sixth switch to connect the plurality of battery packs in parallel.

12. The electrified vehicle of claim 1, further comprising a controller executing a single port to individual battery pack passive charge transfer mode of operation of the electrified vehicle comprising opening each respective third switch to disconnect the plurality of charge ports from the corresponding motor stator windings, closing the respective first and second switches corresponding to at least one of the plurality of charge ports.

13. The electrified vehicle of claim 2, further comprising a controller executing a single port to parallel battery pack active charge transfer mode of operation of the electrified vehicle comprising closing the respective second and third switches corresponding to one of the plurality of charge ports, opening the respective first switch corresponding to the one of the plurality of charge ports, opening the respective first, second and third switches corresponding to every other of the plurality of charge ports, and closing each respective fourth, fifth and sixth switch to connect the plurality of battery packs in parallel.

14. The electrified vehicle of claim 1, further comprising a controller executing a single port to individual battery pack active charge transfer mode of operation of the electrified vehicle comprising closing the respective second and third switches corresponding to at least one of the plurality of charge ports, opening the respective first switch corresponding to the at least one of the plurality of charge ports, opening the respective first, second and third switches corresponding to every other of the plurality of charge ports, and closing each respective fourth and fifth switch corresponding to the respective battery pack that is coupled by the respective second switch corresponding to the at least one of the plurality of charge ports.

15. The electrified vehicle of claim 1, further comprising:
a controller executing a mixed passive charge transfer and active charge transfer mode of operation of the electrified vehicle comprising:
for a first one of the plurality of charge ports, closing the respective first and second switches, opening the respective third switch, and closing the respective fourth, and fifth switches corresponding to the respective battery pack that is coupled by the respective second switch corresponding to the first one of the plurality of charge ports; and
for a second one of the plurality of charge ports, closing the respective second and third switches, opening the respective first switch, and closing each respective fourth and fifth switch corresponding to the respective battery pack that is coupled by the respective second switch corresponding to the second one of the plurality of charge ports.

16. The electrified vehicle of claim 4, further comprising a controller executing a pre-charge mode of operation of the electrified vehicle comprising opening each respective first, second, third and fourth switch, closing each respective fifth and sixth switch, and activating at least one of the respective pre-charge circuits.

17. An electrified vehicle, comprising:
a plurality of electric drive units (EDUs), each EDU comprising a corresponding power inverter coupled to a corresponding motor stator winding, to a corresponding positive DC rail and to a corresponding negative DC rail, all negative DC rails being commonly coupled;
a plurality of battery packs, each battery pack comprising a corresponding battery pack positive terminal and a corresponding battery pack negative terminal;
a plurality of charge ports, each charge port comprising a corresponding charge port positive terminal and a corresponding charge port negative terminal;
a plurality of controllable switches; and
a controller configured to selectively control the plurality of controllable switches:
in a propulsion mode disconnecting the plurality of charge ports from the plurality of battery packs and the plurality of EDUs, and connecting the plurality of battery packs and the plurality of EDUs in parallel,
in a parallel charge transfer mode connecting the plurality of battery packs in parallel and connecting at least one of the plurality of charge ports to the plurality of battery packs, and
in an inverter integrated converter charge transfer mode disconnecting the respective charge port positive terminal of one of the plurality of charge ports from the plurality of battery packs, connecting the respective charge port positive terminal of the one of the plurality of charge ports to the motor stator winding of one of the plurality of EDUs, connecting the respective charge port negative terminal of the one of the plurality of charge ports to the respective battery pack negative terminal of one of the plurality of battery packs, connecting the respective positive DC rail of the one of the plurality of EDUs to the respective battery pack positive terminal of the one of the plurality of battery packs, and connecting the respective negative DC rail of the one of the plurality of EDUs to the respective battery pack negative terminal of the one of the plurality of battery packs.

18. The electrified vehicle of claim 17, wherein each EDU further comprises a respective pre-charge circuit.

19. The electrified vehicle of claim 17, wherein each battery pack comprises an equivalent nominal voltage.

20. The electrified vehicle of claim 18, wherein the controller is further configured to selectively control the plurality of controllable switches in a pre-charge mode disconnecting the plurality of charge ports from the plurality of battery packs and the plurality of EDUs, connecting each respective negative DC rail of the plurality of EDUs to the respective battery pack negative terminal of one of the plurality of battery packs, and activating at least one of the respective pre-charge circuits.

\* \* \* \* \*